Patented July 12, 1932

1,867,188

UNITED STATES PATENT OFFICE

JOHANN JOSEPH STOECKLY, OF TELTOW-SEEHOF, AND ERHARD WITTE, OF BERLIN-LICHTERFELDE, GERMANY

REISSUED

METHODS OF FORMING ARTIFICIAL SILK, ETC., OF MAT APPEARANCE

No Drawing. Application filed April 25, 1930, Serial No. 447,418, and in Germany April 17, 1929.

It is well known that certain structural abnormalities and inhomogeneities have been found in cellulose objects, such as artificial silk, horse-hair, films, etc., which have been regenerated from cellulose solutions and more especially from viscose solutions. These inhomogeneities of the cellulose are often visible in photographic cuts in the form of indistinct shades, small cracks, scars, etc. In all cases where these inhomogeneities occur, the usual high lustre and transparency of the finished product are either dimmed, reduced, or lost entirely. These defects generally appear when spinning comparatively fresh viscose in acid baths. In general it is quite difficult to determine, exactly, the ageing degree of the viscose and the other spinning conditions, so that materials manufactured in the regular process will have an equally distributed reduced lustre and a regular dull finish.

The purpose of this invention is therefore to produce cellulose articles with a dull finish or with a certain degree of dullness by means of creating the above mentioned abnormalities and inhomogeneities in the cellulose articles in a special and new form without actually producing or retaining any hollow spaces, such as the objectionable cracks and scars.

According to this new process, prior to the spinning of the cellulose solution, practically insoluble but emulsifiable bodies in fine particles in the form of organic liquids, are introduced into the solution. Such organic liquids may be liquid paraffin, petroleum, oils of all kinds such as mineral oils, vegetable oils, bone oils, hydrocarbons and their derivatives, hydrogenated hydrocarbons, or terpene. Use may be made, also, of solid or semi-solid plastic, bodies in soluble form e. g., dissolved in organic solvents. Among such substances may be mentioned, fats, talcs, and waxes such as earth-wax, grafting-wax or bees-wax. The bodies are finely emulsified in the cellulose solutions by means of any well known suitable apparatus, and after the desired degree of ageing has been obtained, the material, for example the viscose, is then spun in the usual way. Suitable for precipitation of the viscose are the well known acid baths which contain salts, especially sulfates, and organic substances. After washing and drying, the suspended bodies in the thread are extracted by means of solvents which are capable of dissolving the incorporated bodies. If the thread is not yet dried the cellulose is still in a rather highly swollen condition so that the extraction is facilitated. In the case of dried threads the cellulose can again be brought to the swollen condition through the use of water. The dissolving process is even faster and more thorough if swelling agents such as diluted alkalis and salt solutions are used. The extraction of the incorporated bodies may also be effectively accomplished by the use of heat. In more delicate cases where the swelling agent for cellulose and the dissolving agent for the incorporated bodies repel each other, e. g., water as swelling agent and toluol as dissolving agent, it is recommended that a third liquid be added, such as one that is at least partly soluble or mixable in the dissolving agent, as well, as in the swelling agent. In many cases it has been found that the use of an intermediate liquid such as acetone, alcohol, glycerin, etc., has given very good results. The swollen condition of the cellulose articles, while the incorporated bodies are being extracted, is a guarantee that there will be no hollow spaces left.

It is recommended that a fine and uniform dispersion be made of the body to be incorporated in the cellulose solution and in the cellulose articles from which the particles are to be extracted. Under these circumstances the extraction of the incorporated bodies will be easier at a later period. The resulting abnormalities and inhomogeneities become, therefore, more regular and more uniform in the finished product. With a fine and uniform dispersion there is no danger that the solidity of the material produced will be diminished in various cross-sections, which may occur if too big a conglomeration of the incorporated bodies or of the structural inhomogeneities has taken place in certain parts of the material. In order to obtain this result, according to this invention, small portions of deflocculating or dispersing agents are added to the cellulose emulsion. In certain cases it is necessary to use a specific deflocculation agent which may be suitably mixed with the cellulose solution and the type of emulsified bodies used.

An example will show the manner in which this process may be carried out.

Turkey red oil may be used as a deflocculating agent when the cellulose solution is viscose and liquid paraffin is the emulsifiable agent. These may be emulsified by agitation in any well known manner.

A mixture of 1.5 to 15 liters of such an emulsion may be added to 1000 liters of the viscose solution. By following the improved process described above, filaments, films, etc., possessing a uniform mat appearance, may be produced.

Although only one specific example of my improved process has been given, it is apparent, from the disclosure, that other combinations and percentages of materials may be used, and we do not intend to hereby limit the invention to the particular example given.

What we claim is:

1. In the production of artificial cellulosic materials of the class described possessing a mat appearance, the steps of incorporating in the cellulosic spinning solution an emulsified suspension of an organic substance which is insoluble in the spinning solution, thereafter extruding the spinning solution and extracting the organic substance prior to drying the product and while the artificial cellulosic material is in a swollen condition.

2. In the production of artificial material of the class described possessing a mat appearance, the steps of preparing an emulsion of an organic substance which is substantially insoluble in the cellulosic solution, adding this emulsion to the spinning solution, extruding the spinning solution into a precipitating bath, and extracting the emulsified insoluble material prior to drying the product and while the artificial cellulosic material is in a swollen condition.

3. The process as set forth in claim 1 wherein the emulsion is stabilized by the addition of a deflocculating agent.

4. In the production of artificial filaments possessing a mat appearance, the steps of incorporating in the solution to be spun an emulsified suspension of an organic oil which is insoluble in the spinning solution, extruding the solution to form filaments, and thereafter, prior to the drying thereof, extracting the said oil from the filaments, while they are in a swollen condition.

5. In the production of artificial filaments possessing a mat appearance, the steps of incorporating in the solution to be spun an emulsified suspension of paraffin which is insoluble in the spinning solution, extruding the solution to form filaments, and thereafter, prior to the drying thereof, extracting the said paraffin from the filaments, while they are in a swollen condition.

In testimony whereof, we have affixed our names to this application this 10th day of April, 1930.

JOHANN JOSEPH STOECKLY.
ERHARD WITTE.

DISCLAIMER 1,867,188.—*Johann Joseph Stoeckly*, Teltow-Seehof, and *Erhard Witte*, Berlin-Lichterfelde, Germany. METHODS OF FORMING ARTIFICIAL SILK, ETC., OF MAT APPEARANCE. Patent dated July 12, 1932. Disclaimer filed January 4, 1937, by the assignee, *North American Rayon Corporation*.

Hereby enters this disclaimer of a construction of the claims in such specification, such as would include removal of the organic substance referred to in claim 1, the emulsified insoluble material referred to in claims 2 and 3, the oil referred to in claim 4, and the paraffin referred to in claim 5, other than by means of a solvent capable of dissolving such substance.

[*Official Gazette January 26, 1937.*]